(12) United States Patent
Tammelin et al.

(10) Patent No.: US 10,000,614 B2
(45) Date of Patent: Jun. 19, 2018

(54) METHOD FOR THE PREPARATION OF NFC FILMS ON SUPPORTS

(71) Applicants: Teknologian tutkimuskeskus VTT Oy, Espoo (FI); Aalto University Foundation sr, Aalto (FI)

(72) Inventors: Tekla Tammelin, Espoo (FI); Ulla Hippi, Helsinki (FI); Arto Salminen, Espoo (FI)

(73) Assignees: Teknologian tutkimuskeskus VTT Oy, Espoo (FI); Aalto University Foundation sr, Aalto (FI)

( * ) Notice: Subject to any disclaimer, the term of this patent is extended or adjusted under 35 U.S.C. 154(b) by 757 days.

(21) Appl. No.: 14/353,775

(22) PCT Filed: Oct. 23, 2012

(86) PCT No.: PCT/FI2012/051015
§ 371 (c)(1),
(2) Date: Apr. 24, 2014

(87) PCT Pub. No.: WO2013/060934
PCT Pub. Date: May 2, 2013

(65) Prior Publication Data
US 2014/0255688 A1    Sep. 11, 2014

(30) Foreign Application Priority Data
Oct. 24, 2011 (FI) .................................... 20116048

(51) Int. Cl.
*C08J 5/18* (2006.01)
(52) U.S. Cl.
CPC .............. *C08J 5/18* (2013.01); *C08J 2301/02* (2013.01); *Y10T 428/269* (2015.01); *Y10T 428/31971* (2015.04)
(58) Field of Classification Search
CPC ......... Y10T 428/31971; Y10T 428/269; B32B 27/12
See application file for complete search history.

(56) References Cited

U.S. PATENT DOCUMENTS

| 2010/0151159 | A1 | 6/2010 | Beck et al. |
| 2010/0291822 | A1 | 11/2010 | Netravali |
| 2013/0022827 | A1* | 1/2013 | Imai ................... B32B 27/12 428/446 |
| 2014/0234640 | A1 | 8/2014 | Kohno et al. |

FOREIGN PATENT DOCUMENTS

| EM | 2554589 A1 | 2/2013 |
| EP | 1222306 | 12/2004 |
| EP | 2196476 A1 | 6/2010 |
| EP | 2395027 A1 | 12/2011 |
| JP | 2010202856 A | 9/2010 |
| JP | 2010260317 A | 11/2010 |
| JP | 2011016995 A | 1/2011 |
| JP | 2011122014 A | 6/2011 |
| JP | 2012107643 A2 | 8/2012 |
| JP | 2013031687 A1 | 3/2013 |

OTHER PUBLICATIONS

Hamada et al. "Nanofibrillated cellulose as a coating agent to improve print quality of synthetic fiber sheets", Tappi Journal (2010), 9(11), 25-29.*
Chinga-Carrasco, Gary & al. Computer-assisted quantification of the multi-scale structure films made of nanofibrillated cellulose. J Nanopart Res (2010).
Hamada, Hitomi & al. Nanofibrillated cellulose as a coating agent TAPPI Journal 25, Nov. 2010.
Syverud, Kristin & al. Strength and barrier properties of MFC films. Cellulose (2009).

* cited by examiner

*Primary Examiner* — Nicole M Buie-Hatcher
(74) *Attorney, Agent, or Firm* — Seppo Laine Oy

(57) ABSTRACT

The present invention concerns a method of preparing a film of nanofibrillated cellulose (NFC) on at least one surface of a support material, wherein the film is applied and spread directly onto a surface of the plastic support material in the form of a suspension of nanofibrillated cellulose, whereby the nanofibrillated cellulose forms a film. Further, the invention concerns a structure containing or consisting of a film of nanofibrillated cellulose prepared using said method.

5 Claims, No Drawings

METHOD FOR THE PREPARATION OF NFC FILMS ON SUPPORTS

FIELD OF THE INVENTION

The present invention concerns a method for the preparation of large scale films of nanofibrillated cellulose on tailored support materials. Further, the invention concerns the film structures obtained with such a method.

DESCRIPTION OF RELATED ART

Nanofibrillated cellulose is a material, which can be prepared from macroscale cellulosic fibres by a combination of enzymatic or chemical and mechanical treatments (Pääkkö M. et al. Biomacromolecules 27 (2007) 1934-1941). Due to the high aspect ratio, nanoscale fine structure, strong self-association tendency and swelling ability, NFC forms gel-like structures already at very low solids contents (<2 wt-%).

Upon drying, the NFC has an ability to form films also on supports through the strong interactions between the surface hydroxyl groups. Previously it has been reported that strong film and membrane structures can be prepared using NFC by solvent casting (Aulin C. et al. Cellulose 17 (2010) 559-574) and by the filtration procedure also at moderately large scale (Henriksson M. et al. Biomacromolecules 9 (2009) 1579-1585; and Sehaqui H. et al. Biomacromolecules 11 (2010) 2195-2198).

However, the challenge related to the slow dewatering of the films due to strong water binding ability has limited the real large scale manufacturing process.

In addition, the strong attractive interactions between the surface hydroxyl groups on the fibril surface leads to remarkable shrinkage of the formed films during drying. This leads to the partial loss of, among others, the strength properties of the NFC films.

The advantageous properties of structures including nanocellulose films, such as their barrier properties, are known, and there is a lot of research relating to this technology. Industrial applications include, among others, flat screens and food packaging.

JP 2010260317 concerns a method of manufacturing a layered structure, wherein an organic layer is first provided on a substrate, whereafter a nanofiber layer is applied onto the organic layer. This structure is said to provide excellent adhesion.

WO 2007/088974 concerns a method of imparting water repellency and oil resistance with the use of cellulose nanofiber, wherein a cellulose-nanofiber-containing liquid is used to impregnate or apply onto a base material, most suitably being paper. However, when coating paper, the nanofiber layer will not be smooth.

Further, although the above described advantageous properties of the obtained films can be obtained using the prior art processes, the processes have disadvantages, such as failing to provide smooth films, slow dewatering and causing shrinkage.

Thus, there remains a need for a method of preparing films of nanofibrillated cellulose having smooth surfaces and being suitable for large scale production, while avoiding the slow dewatering and the shrinkage normally related to such methods.

SUMMARY OF THE INVENTION

It is an aim of the present invention to provide films of nanofibrillated cellulose having smooth surfaces, and being essentially translucent or transparent, at least without added colorant, and a method for preparing such films.

Particularly, it is an aim of the present invention to provide a method of preparing films of nanofibrillated cellulose or supports coated with such films, which method avoids slow dewatering and shrinkage of the film.

These and other objects, together with the advantages thereof over known films, coated supports and methods, are achieved by the present invention, as hereinafter described and claimed.

The invention describes a method of preparing smooth and even films of nanofibrillated cellulose (NFC) in large scale. The films are prepared on film supports, such as supports made of plastic, by controlling the adhesion and the spreading of the NFC on the support material. Detachable and removable films can be prepared, or films of double layer structures (NFC+support). An NFC suspension can be applied onto the plastic by rod, blade or roll coating methods. A combination of the suitable support, controlled drying and hot pressing enables controlling the porosity of the NFC films and, thus, transparent and strong films with thicknesses of 50 to 150 µm, among others having good oxygen barrier properties, can be manufactured.

Thus, the present invention concerns a method of preparing a film of nanofibrillated cellulose (NFC) on at least one surface of a support material.

More specifically, the film structure of the present invention is characterized by what is stated in claim 1.

The basic idea of the invention is to prepare large scale, thin and dense films of nanofibrillated cellulose on the support material with a tailored surface energy in order to control the adhesion and the spreading of NFC on the support material. The formed NFC films can either be removed from the support (to provide thin films of only NFC) or they can be retained attached to the support (to provide structures of two or more layers).

Considerable advantages are obtained by means of the invention. Thus, the present invention provides a method for preparing even, dense, strong and uniform films from widely selectable NFC materials, the method being suitable for use in large scale roll-to-roll production of NFC films and membranes. All the operations described here can be up-scaled and transformed into on-line solutions.

The films can be used as effective barriers for oxygen and grease, and they can act as strong starting materials and templates for, e.g., nanocomposites and thermosets.

Further, the film manufacturing method described here overcomes both of the above mentioned challenges of slow dewatering and shrinkage.

Next, the invention will be described more closely with reference to a detailed description.

DETAILED DESCRIPTION OF THE PREFERRED EMBODIMENTS OF THE INVENTION

The present invention concerns a method of preparing a film of nanofibrillated cellulose (NFC) on at least one surface of a support material. The film is applied and spread out directly onto a surface of the support material as a suspension of nanofibrillated cellulose, whereby the NFC forms a film.

Further, the invention concerns a structure containing a film of nanofibrillated cellulose, or consisting of such a film, the structure having been prepared using said method. A structure containing said film can, for example, be a structure formed from several layers, such as one or more film layers on a support layer, further optionally including other layers, while a structure consisting of said film is formed of a mere film layer in the absence of the support.

The basic idea of the invention is to prepare large scale, thin and dense films of nanofibrillated cellulose on a support material with a tailored surface energy. Such tailored support materials can be manufactured from, for example, polyethylene, polypropylene, polyamide, polyvinyl chloride (PVC) and polyethylene terephthalate (PET). The tailoring can be carried out, for example, via activation of the surface using a plasma or corona treatment.

Thus, the invention describes a method of preparing smooth and even films of nanofibrillated cellulose (NFC) in large scale. The films are prepared on film supports by controlling the adhesion and the spreading of the NFC on the support material. Detachable and removable films can be prepared, or films of layered structures (NFC+support).

The adhesion (and the spreading) is generally controlled by selecting the type of NFC and the type of support material in a manner providing them with compatible surface energies. Either one or both of the NFC and the support may, for example, be modified to improve the adhesion. Thus, the method of the present invention can include a step of treating the surface of the support (using e.g. plasma or corona treatments) or a step of modifying at least the surface of the NFC (using e.g. silylation), or both these steps.

Since the attachment of the NFC onto the support takes place via the reactive groups on the surfaces of both the NFC and the support, such as the hydroxyl groups on the cellulose surface, the addition of further reactive groups on both the NFC and the support will naturally increase the adhesion, as will increasing the hydrophilic nature of the support (hydrophilized e.g. using plasma or corona treatments) when used together with hydrophilic NFC, or adding hydrophobic groups on the support surface when used together with hydrophobic NFC.

Compatible combinations of NFC and support include the following preferred options:
1) Selecting support layers with surface energies which allow sufficient spreading and adhesion of NFC. Examples of these are: hydrophobic support and hydrophobized NFC (e.g. polystyrene/PE/PP+silylated NFC) as well as hydrophilic support and hydrophilic NFC (e.g. cellulose derivative supports +unmodified NFC).
2) Selecting support layers with surface energies that can be tailored using, e.g., corona/plasma treatments in order to enhance the compatibility with the NFC (e.g. plasma/corona treated PE+unmodified NFC).

A combination of a suitable support, controlled drying and an optional hot pressing enables controlling the porosity of the NFC films and, thus, transparent and strong films with advantageous thicknesses, among others having good oxygen barrier properties, can be manufactured.

Preferably, such a nanofibrillated cellulose is used, which can be dispersed into water or another solvent wherein the NFC forms a gel, particularly selected from unmodified, hydrophobized or otherwise chemically modified NFC, such as NFC modified by introducing reactive groups. For example, the NFC can be modified by oxidizing or silylating. However, a particularly preferred type of NFC for use in the present invention is fine, unmodified nanofibrillated cellulose, most suitably having a fiber width from 5 nm to submicron values and a fiber length up to several micrometers, particularly up to 30 μm.

Most suitably, the NFC is selected from those types having a film forming ability. In case of hydrophobic NFC types, it is also preferred to select the NFC from those types providing the film with a contact angel of water of larger than 90 degrees.

The suspension of nanofibrillated cellulose is generally formed using a solvent or a solvent mixture, whereby the solvent, when used alone, preferably is water, and the solvent mixture preferably contains water, more preferably consisting of a mixture of water and an organic solvent, more preferably a 1:5 to 5:1 mixture of water and an organic solvent. The organic solvent is selected based on its hydrophobicity/polarity, i.e. by providing a solvent or a solvent mixture having a polarity that essentially matches that of the NFC or the modified NFC. As stated above, a particularly preferred solvent is water. Other similarly preferred options are organic solvents that are compatible with regular unmodified NFC, such as dimethylacetamide and methanol. According to another option, the suspension is formed using a solvent mixture consisting of water and a polar organic solvent.

Conventional organic solvents may be used. However, the suitable solvent is preferably selected according to its hydrophobicity. Thus, the solvents can be divided into groups, based on their polarity and ability to form hydrogen bonds:

Solvents considered to be non-polar include hexane, benzene, toluene, diethyl ether, chloroform and 1,4-dioxane.

Solvents considered to be polar, while aprotic, include ethyl acetate, tetrahydrofuran, dichloromethane, acetone, acetonitrile, dimethyl formamide and dimethyl sulfoxide.

Solvents considered to be polar and protic include acetic acid, n-butanol, isopropanol, n-propanol, ethanol, methanol and formic acid.

Also water is considered to be polar and protic.

An exemplary suitable solvent mixture is a 1:1 mixture of water and methanol.

Controlling the solids content of the suspension is not essential. It is sufficient to use a suspension that forms a film without forming aggregates.

However, according to a preferred embodiment, the used suspension contains less than 2 wt-% nanofibrillated cellulose, preferably 0.25 to 2 wt-% nanofibrillated cellulose.

The film formation can optionally be assisted by the addition of plasticizers, such as glycerol or sorbitol, or a mixture thereof. The use of plasticizers is not necessary, since the used NFC is capable of forming a film, as such, but the plasticizer can further improve the mechanical properties of the resulting film.

According to an embodiment of the invention, the nanofibrillated cellulose is applied on a support made of a plastic material, preferably selected from polyethylene, polystyrene and a cellulose ester. The support is selected from materials of low porosity to prevent the filtration of the NFC suspension. Procedures utilizing filtration are less suitable for use in manufacturing large uniform structures, particularly in continuous processes. On the contrary, the materials used in the present invention are suitable for use in roll-to-roll type continuous processes.

The hydrophobicity of the support can be selected or modified to provide a suitable adhesion to the NFC. This adhesion should be strong enough to provide the needed attachment during drying to prevent shrinkage, but not so strong as to prevent detachment of the dried film from the support in cases where the structure to be prepared consists of only said NFC film.

Both the nanofibrillated cellulose and the support material may be chemically modified, prior to formation of the film, by the addition of charged, hydrophobic or polar functional groups, preferably selected from functional groups containing one or more O, S or N atoms or one or more double bonds, most suitably selected from hydroxyl and carboxyl groups.

The application onto the support may be carried out, for example by a rod, blade or roll coating method.

The thickness of the film of nanofibrillated cellulose applied onto the support is preferably in the range of 50 to 150 µm. The thickness of the support is not an essential parameter. However, generally the thickness of the used support ranges between 150 µm and 2000 µm.

Generally, the film suspension is dried, after applying onto the support, via controlled evaporation, preferably at a high temperature, optimized to a point where hydroxyl groups are able to interact at an advantageous rate through self-association, which leads to even film formation. Particularly, the film suspension is dried at a temperature that is ≤60° C., more preferably at a temperature in the range of 25 to 60° C. most suitably at room temperature, whereby the film material solidifies at an advantageous rate. Thus, slow dewatering via filtration is avoided. Concomitantly, the sufficient adhesion with the support material prevents the shrinkage of the NFC film upon drying.

The film may either be detached from the support prior to use or prior to further processing or the film may be used or further processed as a layered structure, while still attached to the support. The detaching may be carried out, e.g. by re-wetting the film using a solvent or a solvent mixture, most suitably using methanol.

The dried film may further be pressed, preferably by hot pressing, preferably at a temperature of 60 to 95° C., most suitably at a temperature of 80° C., to obtain a thinner and more dense film structure with a controlled porosity. The pressing can be carried out either on the film, as such, or with the film still attached to the support.

This procedure to prepare even, dense and uniform films can be regarded as a route to large scale roll-to-roll production of NFC films and membranes. The films can be used as effective barrier films for oxygen and grease, and they can act as a strong starting material for, e.g. nanocomposites and thermosets.

As stated above, the film of the obtained structure containing or consisting of a film of nanofibrillated cellulose preferably has a thickness of 50 to 150 µm.

The film may be present as a coating on at least one surface of the support, which preferably is made of a plastic material, more preferably from polyethylene, polystyrene or a cellulose ester, or the film may be used as such, i.e. without the presence of the support.

The basic idea of the invention is to prepare large scale, thin and dense films of nanofibrillated cellulose on the support material with a tailored surface energy in order to control the adhesion and the spreading of NFC on the support materials. The formed NFC films can either be removed from the support (to provide thin films of only NFC) or they can be retained attached to the support (to provide structures of two or more layers).

The products formed using the present invention can be further applied in the production of larger structures, such as laminated (nano)composite materials, food packaging materials and medical bandages or wound treatments, or as supports for functionalities, e.g. printed intelligence. Examples of suitable structures to be prepared using the film structures of the present invention are layered structures containing resin between two or more structures according to the present invention.

The following examples are intended to illustrate the preferred embodiments of the invention without limiting the scope of the invention.

EXAMPLES

Examples of compatible combinations of the NFC and support materials, providing suitable film structures include the following, wherein the NFC has been applied on the support by direct casting (see Example 1) or by roll coating and dried at a temperature of less than 60° C.:

Example 1

Using Supports with Strong Adhesion and High Compatibility with NFC

An NFC film was cast on cellulose ester by applying a dilute dispersion of NFC on the cellulose ester film and drying at room temperature.

Double layer film structures are achieved, with the NFC film still attached to the support.

Example 2

Using Supports with Moderate Adhesion and Tailored Compatibility with NFC

The used support is made of a film of polyethylene, which is first hydrophilized by plasma or corona treatments prior to the NFC application.

Large and uniform NFC films are achieved that can either be detached/removed from the support or left on the support, thus forming a layered structure.

Example 3

Using Hydrophobic Plastic Films as Supports for Treated NFC with Strong Adhesion Several structures were manufactured. The used supports were made of films of polyethylene and polystyrene, and the NFC was hydrophobized by silylation prior to application onto the support.

Double layer film structures are achieved, whereby the film can either be detached/removed from the support by re-wetting the film with methanol, or left on the support, thus forming a layered structure.

The invention claimed is:

1. A structure comprising a film of nanofibrillated cellulose (NFC), wherein the film is prepared by applying and spreading a suspension of nanofibrillated cellulose directly onto a surface of a plastic support material and drying via controlled evaporation at a temperature maintained below 60° C., whereby the nanofibrillated cellulose forms a film on said support material, and wherein the NFC film has a thickness of 50 to 150 µm.

2. The structure of claim 1, wherein the nanofibrillated cellulose has been selected from unmodified or chemically modified nanofibrillated cellulose having a fiber width from 5 nm to submicron values and a fiber length of up to 30 µm.

3. The structure according to claim 1, wherein the NFC film is present as a coating on at least one surface of the support.

4. The structure according to claim 1, which consists of the film of nanofibrillated cellulose, capable of being detached from the support.

5. The structure according to claim 1, wherein such a nanofibrillated cellulose is used, which can be dispersed into water or another compatible solvent, wherein it forms a gel.

* * * * *